March 8, 1966     L. R. PALMER     3,239,240
FIFTH WHEEL COUPLING DEVICE
Filed June 15, 1964     3 Sheets-Sheet 1
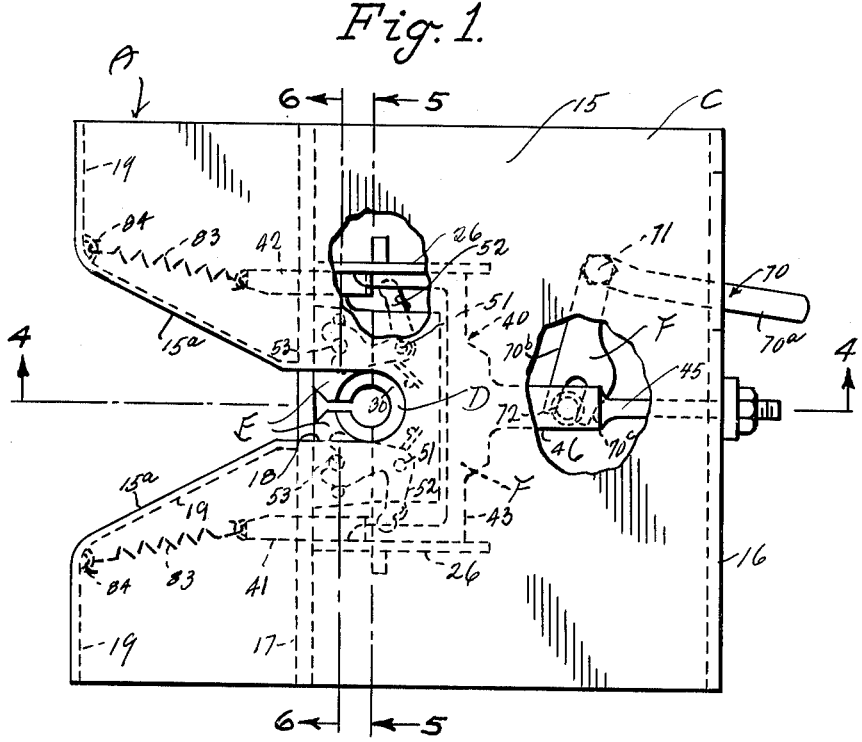
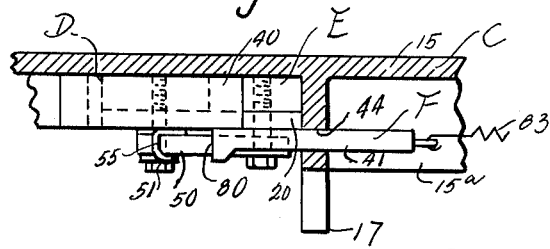
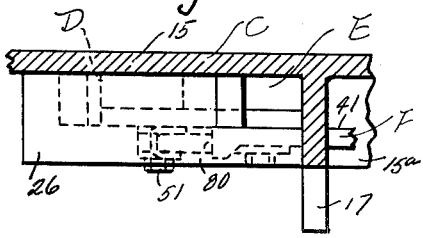
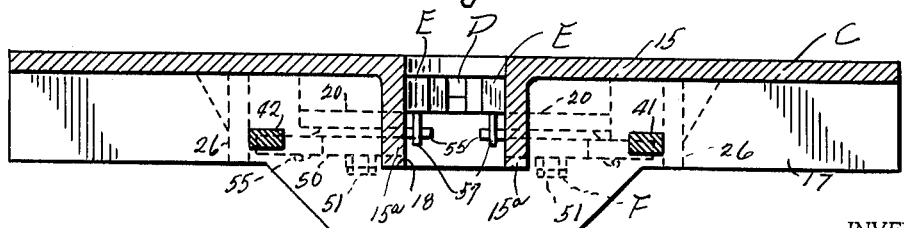
INVENTOR
LAWRENCE R. PALMER
BY
ATTORNEYS March 8, 1966  L. R. PALMER  3,239,240
FIFTH WHEEL COUPLING DEVICE
Filed June 15, 1964  3 Sheets-Sheet 2

INVENTOR
LAWRENCE R. PALMER
BY *Rommel, Alwine and Rommel*
ATTORNEYS

March 8, 1966
L. R. PALMER
3,239,240
FIFTH WHEEL COUPLING DEVICE
Filed June 15, 1964
3 Sheets-Sheet 3
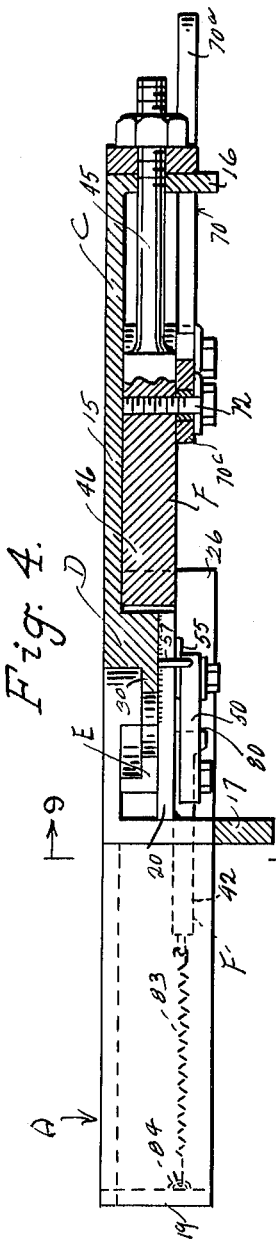
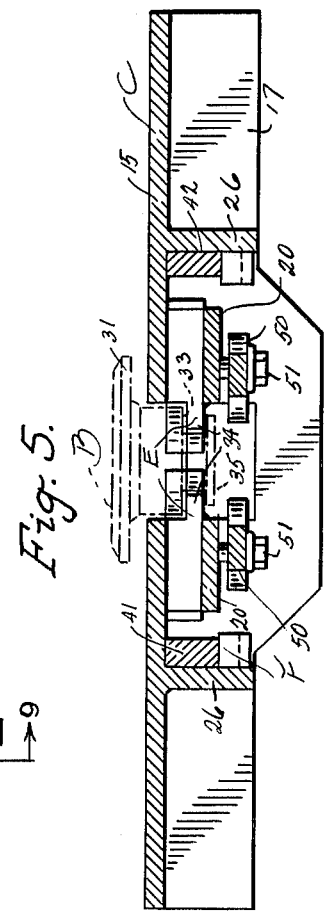
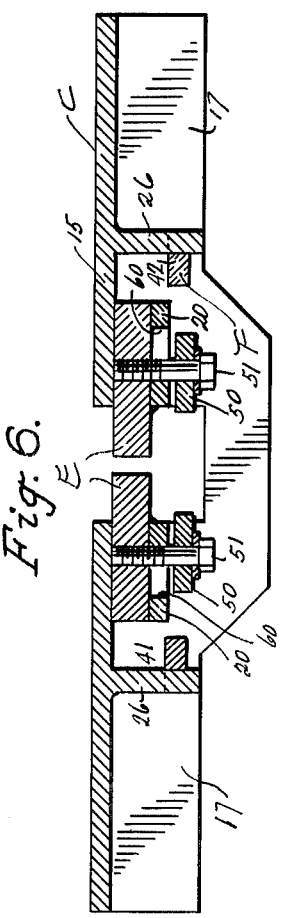
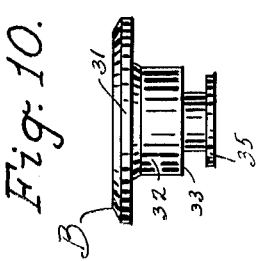
INVENTOR
LAWRENCE R. PALMER
BY
ATTORNEYS

United States Patent Office

3,239,240
Patented Mar. 8, 1966

3,239,240
FIFTH WHEEL COUPLING DEVICE
Lawrence R. Palmer, Box 358, Amory, Miss.
Filed June 15, 1964, Ser. No. 375,115
6 Claims. (Cl. 280—434)

This invention relates to improvements in coupling mechanisms known in the art as fifth wheels for the detachable connection of a draft vehicle, such as a tractor, to a trailer.

There are many coupling mechanisms known as fifth wheels for attaching a trailer to a draft vehicle. Many of them have jaw mechanisms which either do not afford positive locks or are not easily operated to serve as a coupling for assembling or dismantling a trailer to a tractor. It is therefore a purpose of the present invention to provide a relatively simple fifth wheel or coupling mechanism having a sturdy arrangement of jaws on the frame and means for operating them so as to enable the safe and facile action of the coupling mechanism at all times.

Other objects and advantages of this invention will be apparent during the course of the following detailed description.

In the accompanying drawings, forming a part of this specification, and wherein similar reference characters designate corresponding parts throughout the several views:

FIGURE 1 is a plan view of the coupling, with certain parts broken away showing relative details thereof.

FIGURE 4 is a longitudinal cross sectional view taken through the coupling mechanism, substantially on the line 4—4 of FIG. 1.

FIGURES 5 and 6 are transverse cross sectional views of the coupling, taken substantially on the respective lines 5—5 and 6—6 shown in FIG. 1.

Figure 2:
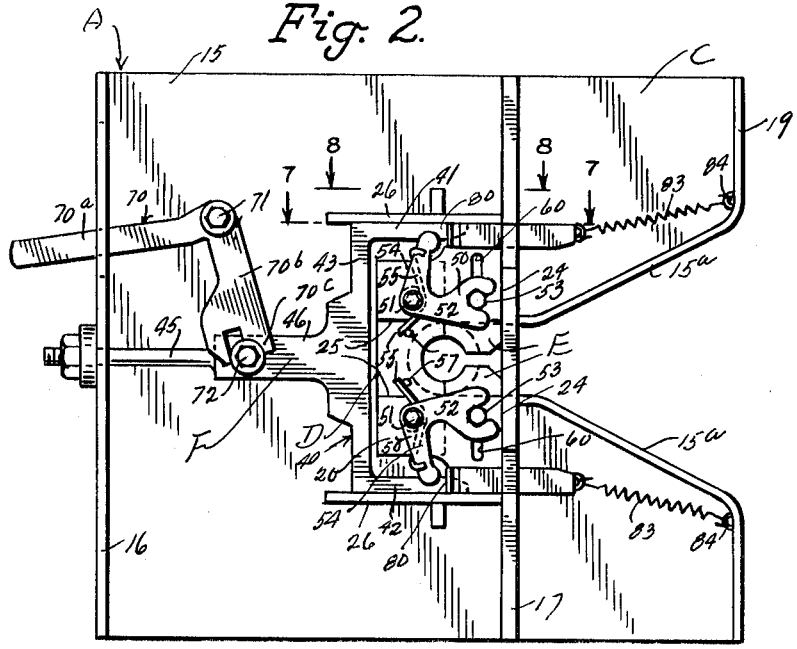
FIGURE 2 is a bottom or inverted plan view of the fifth wheel or coupling mechanism showing the jaws in closed or latching position.

FIGURES 7 and 8 are upright cross sectional views of the coupling, taken substantially on the respective lines 7—7 and 8—8 shown in FIG. 2.

FIGURE 9 is a cross sectional view taken substantially on the line 9—9 of FIG. 4, showing frame and jaw operating details of the coupling mechanism.

FIGURE 10 is a side elevation of a king pin of a type generally used on trailers in connection with attachment of the trailer to the coupling mechanism of the draft vehicle.

In the drawings, wherein for the purpose of illustration is shown only a preferred embodiment of the invention, the letter A may generally designate the coupling mechanism or fifth wheel, as it is generally known in the art. It is of a type adapted to attach the king pin B of a trailer to a draft vehicle such as a tractor. The coupling mechanism A includes a main frame C having a stationary jaw D thereon and a pair of sliding jaws E. The jaws D and E are complementary to each other in their design for the purpose of detachably connecting the king pin B to the coupling mechanism. Means F is provided for opening and closing slidable jaws E of the coupling mechanism A.

The main frame C includes a top plate 15 having at its fore end a depending right angle flange 16 and intermediate its ends having a cross bar or flange 17 in depending right angled relation. The plate 15 at its rear end is bifurcated to define an entrance way for the king pin. The edges 15ª of this entrance way slope convergently forward and terminate in a uniform width passage 18 leading to the stationary jaw D. The rear edges of the plate 15 and the sloping edges 15ª are provided with depending flanges 19. The frame C has integrally connected therewith a retaining plate 20 which supports the sliding jaws E as will be subsequently described. This retaining plate 20 is mounted or otherwise integrally connected to the cross bar 17 at the line locations 24, shown in FIG. 2 and integrally connected to the stationary jaw D at the line locations 25. The retaining plate 20 is spaced from the bottom surface of the top plate 15 to receive the sliding jaws E. The frame structure C furthermore includes guide flanges 26 on the undersides thereof for sliding of a portion of the opening means F, to be subsequently described.

The stationary jaw D as is shown in FIG. 1 is segmental for 180° and provided with a supporting flange 30, shown in FIG. 4 and elsewhere.

The king pin B shown in FIG. 10 includes the head portion 31 adapted to be attached to the trailer having a depending shank 32 which is annularly grooved at 33 and provided with a bottom flange 35. The lip or flange 30 engages in this groove for half of its circumference.

The jaws E are rectilinearly slidable and supported upon the retaining plate 20, as shown in FIG. 5; their rear surfaces engaging the rear surface of the cross bar 17 as shown in FIG. 2 and their fore surfaces engaging the rear edges of the stationary jaw D. The sliding jaws E only move linearly transversely of the coupling in right angled relation to the longitudinal axis thereof. They each are provided with reduced king pin retaining lips 34 which are adapted to engage in the groove 33 of the king pin B as shown in FIG. 5 for the support of the king pin in locked relation upon the coupling A.

Figure 3:
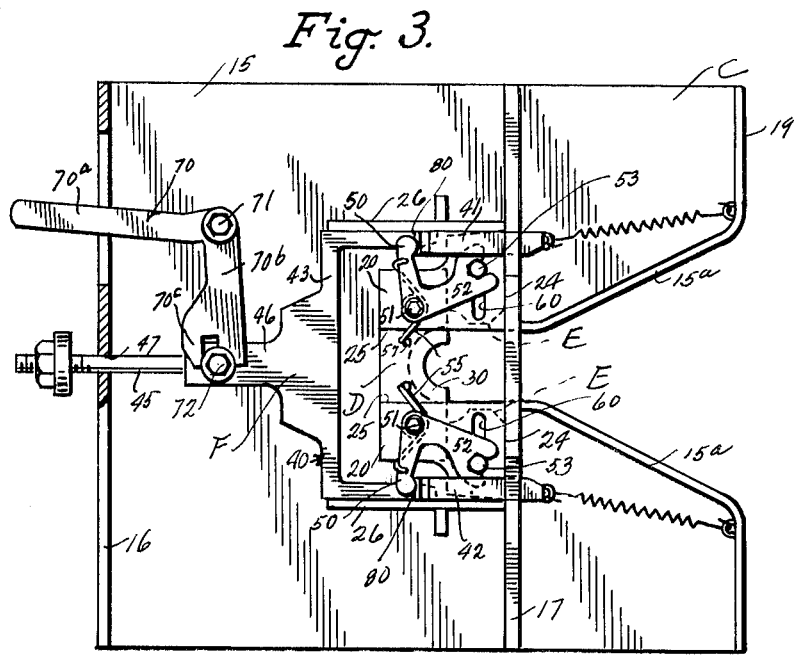
FIGURE 3 is a bottom or inverted plan view similar to FIG. 2 but with the jaws opened so as to permit release of a trailer king pin from the coupling device.

Referring to the means F for operating the slidable jaws between open and close positions, the same comprises a main U-shaped frame 40 including a pair of parallel arms 41 and 42 and a forward cross piece 43. The arms 40 and 41 are supported at their forward ends in passageways 44 of cross piece 17, shown in FIG. 7, for sliding movement and the sides thereof are guided by the frame flanges 26 above described, and as shown in FIGS. 2 and 3. Thus frame 40 can be moved fore and aft. Its rear portion is provided with a longitudinally extending shaft 46 extending along the longitudinal center of the main frame 15, as shown in FIG. 2 and terminating in a circular cross section shaft 45 which bears in a passageway 47 on the depending flange 16 of the main frame C (see FIG. 3).

Through means to be subsequently described the frame 40 can be moved fore and aft for moving the sliding jaws E.

The jaws E are operated by means of bell crank levers 50 which are pivoted at 51 on the retaining plate 20. These bell crank levers 50 have one arm 52 thereof bifurcated at its free end for receiving the depending shank 53 of a jaw E, as shown in FIG. 2; the other arms 54 of the bell crank levers 50 extending in substantially right angled relation to the arms 52. Springs 55 are provided to normally urge these levers 50 into jaw closing position. The springs 55 intermediate their ends are coiled around the pivot bolts 51 and one end portion engaging the arm 54 under tension and its other end engaging a pin 57 on the stationary jaw. The coil is under tension and normally throws the arm portions 52 towards the latch closed relation shown in FIG. 2.

The retaining plate 20 is slotted at 60 to enable the pins 53 to slide back and forth during opening and closing of the jaws or latches E.

A release handle 70 is pivotally mounted at 71 on the plate 15 including a handle portion 70ª which extends through the flange 16, as shown in FIG. 3. It is provided with an arm 70ᵇ having a bifurcated end 70ᶜ adapted to engage a shank 72 which is mounted on the arm 46 of the frame 40 for operating the latches or jaws.

It will be noted that the frame 40 on each of its arms 41 and 42 is provided with a forwardly facing shoulder or abutment 80 which is in position to engage the free end of the arm 54 of each bell crank lever 50 for the purpose of moving the levers 50 from the positions shown in FIG. 2 to the positions shown in FIG. 3 for opening the jaws E as the handle 70 is moved from the position shown in FIG. 2 to the position shown in FIG. 3. This takes place against the resistance of the springs 55.

Beneath the coupling frame there is provided a spring 83 attached to the rear end of each of the arms 41 and 42 and connected at its opposite end at 84 to the main frame of the coupling, normally tending to pull the lever operating frame 40 to the position shown in FIG. 2.

Various changes in the size, shape and arrangement of parts may be made to the form of invention herein shown and described without departing from the spirit of the invention or scope of the claims.

I claim:

1. In a coupling of the fifth wheel type for attachment of the king pin of a trailer to a draft vehicle, the combination of a main frame having a rigid stationary coupling attached thereto provided with a segmental king pin receiving portion, a pair of movable jaws each having king pin receiving segments complementary to the segment of the stationary jaw, levers pivotally mounted on said main frame for each of the moving jaws having a connection therewith, spring means normally urging said movable jaws to a closing position, and operating means including a frame slidably mounted on the main frame having means to enable the movement of said levers for opening said movable jaws.

2. The fifth wheel coupling defined in claim 1 in which spring means is provided for normally urging said sliding frame to an inoperative jaw closing position.

3. In a trailer coupling of the fifth wheel type, the combination of a main frame having a passageway therein through which the king pin of a trailer can move into socketed relation therein, a stationary jaw mounted on said frame having a segmental jaw portion to receive the king pin, a pair of sliding jaws mounted on the frame for transverse linearly sliding upon said frame towards and away from each other, each sliding jaw including a segmental king pin jaw portion complementary to the segment of the stationary jaw, bell crank levers pivotally mounted on said frame each having an arm portion connected to a sliding jaw and spring means normally urging the bell crank lever to a jaw closing position, an auxiliary frame slidably mounted on the main frame having abutments thereon for operating the bell crank levers as the auxiliary frame is moved longitudinally of the main frame, means to move said auxiliary frame, and spring means normally urging said auxiliary frame to an inoperative position.

4. In a trailer coupling of the fifth wheel type, the combination of a main frame having a passageway therein through which the king pin of a trailer can move into socketed relation therein, a stationary jaw mounted on said frame having a segmental jaw portion to receive a portion of the king pin, a pair of sliding jaws mounted on the frame for transverse linearly sliding upon said frame towards and away from each other, each sliding jaw including a segmental king pin jaw portion complementary to the segment of the stationary jaw for securing a portion of the king pin, lever means movably mounted on said frame for each sliding jaw, spring means normally urging the sliding jaws to a closing position, an auxiliary frame slidably mounted on the main frame having means thereon for operating the lever means, means to move said auxiliary frame, and spring means normally biasing said auxiliary frame to an inoperative position.

5. In a trailer coupling of the fifth wheel type, the combination of a main frame having a passageway therein through which the king pin of a trailer can move into socketed relation therein, a stationary jaw mounted on said frame having a segmental jaw portion to receive a portion of the king pin, a pair of sliding jaws mounted on the frame for transverse linearly sliding upon said frame towards and away from each other, each sliding jaw including a segmental king pin jaw portion complementary to the segment of the stationary jaw for securing a portion of the king pin, bell crank levers pivotally mounted on said frame each having an arm portion connected to a sliding jaw and another arm portion, spring means normally urging the bell crank levers to sliding jaw closing positions, an auxilary frame slidably mounted on the frame in a line transverse to the sliding line of the sliding jaws having means thereon for operating the bell crank lever arm portions as the auxiliary frame is moved on the main frame, an operating lever pivoted on the main frame, means connecting the last mentioned lever with said auxiliary frame, and spring means normally urging said auxiliary frame to an inoperative position with the sliding jaws closed.

6. In a coupling of the fifth wheel type for attachment of the king pin of a trailer to a draft vehicle, the combination of a main frame having a rigid stationary coupling attached thereto provided with a segmental king pin receiving socket, a pair of movable jaws each having a king pin receiving socket complementary to the socket of the stationary jaws to form an enclosure when the jaws are in closed position for embracing a king pin, said movable jaws being mounted on the main frame for transverse linearly sliding action towards and away form each other, means for actuating said movable jaws including spring biasing means normally urging said jaws to a closing position, and operating means for opening and closing said movable jaws.

References Cited by the Examiner

UNITED STATES PATENTS 2,102,821  12/1937  Seyferth      280—434
2,783,899   3/1957  Gutridge    280—434 X

FOREIGN PATENTS 111,071   7/1940  Australia.

LEO FRIAGLIA, *Primary Examiner.*